US011391349B1

(12) United States Patent
Jen et al.

(10) Patent No.: US 11,391,349 B1
(45) Date of Patent: Jul. 19, 2022

(54) COMPACT ANGULAR ACTUATOR

(71) Applicant: AMAZON TECHNOLOGIES, INC., Seattle, WA (US)

(72) Inventors: Chih-Wu Jen, Sunnyvale, CA (US); John Edwin Johnston, Redwood City, CA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 0 days.

(21) Appl. No.: 15/905,328

(22) Filed: Feb. 26, 2018

(51) Int. Cl.
*F16H 25/16* (2006.01)
*F16C 23/08* (2006.01)
*F16H 53/06* (2006.01)
*F16H 53/02* (2006.01)

(52) U.S. Cl.
CPC ............. *F16H 25/16* (2013.01); *F16C 23/08* (2013.01); *F16H 53/02* (2013.01); *F16H 53/06* (2013.01); *F16C 2361/41* (2013.01)

(58) Field of Classification Search
CPC ...... F16C 23/08; F16C 2361/41; F16H 25/16; F16H 53/02; F16H 53/06; F16M 11/14
USPC .................... 403/79; 248/184.1, 185.1, 179.1
See application file for complete search history.

(56) References Cited

U.S. PATENT DOCUMENTS

| 1,480,651 A * | 1/1924 | Bailey | F16M 11/126 248/184.1 |
| 4,575,039 A * | 3/1986 | Persson | H01Q 1/18 248/550 |
| 4,951,521 A * | 8/1990 | Jacobson | B23Q 1/0063 29/436 |
| 5,119,580 A * | 6/1992 | Schulte | A01K 91/065 248/522 |
| 5,518,245 A * | 5/1996 | Nelson | A63B 69/3652 108/7 |
| 6,161,806 A * | 12/2000 | Crosson | A47B 11/00 108/139 |
| 7,758,444 B2 * | 7/2010 | Crossley | A63B 69/3652 473/279 |
| 8,141,452 B2 * | 3/2012 | Wood | B23Q 16/025 74/490.13 |
| 8,151,660 B2 * | 4/2012 | Wood | B23Q 1/5406 74/55 |
| 8,575,466 B2 * | 11/2013 | van Ekstrom | G10H 1/32 84/743 |

* cited by examiner

Primary Examiner — Thomas C Diaz
(74) Attorney, Agent, or Firm — Lindauer Law, PLLC

(57) ABSTRACT

A compact angular actuator allows for angular displacement between a first section and a second section. The first section comprises a cam that is circular in cross section and has a wedge-shaped face. The second section comprises two or more constraint components that are in contact with the face of the cam. A hinge joins the first section and the second section in proximity with one another. As the cam is rotated about an axis that is perpendicular to and extends through a center of the circular cross section, the position on the face that the constraint components are in contact with changes. As a result, a force is imparted between the first section and the second section, changing the angular displacement between the two. The actuator fits within a compact volume and allows for precise controlled angular displacement, while allowing that displacement to be maintained without power consumption.

21 Claims, 7 Drawing Sheets

COMPACT ANGULAR ACTUATOR

BACKGROUND

Cameras or other sensors may be used to provide various functionality to a device. In some circumstances, it is advantageous to be able to reposition or move these devices with respect to the rest of the device. For example, a camera may be tilted to allow the field of view of the camera to encompass a different part of a scene.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1A:
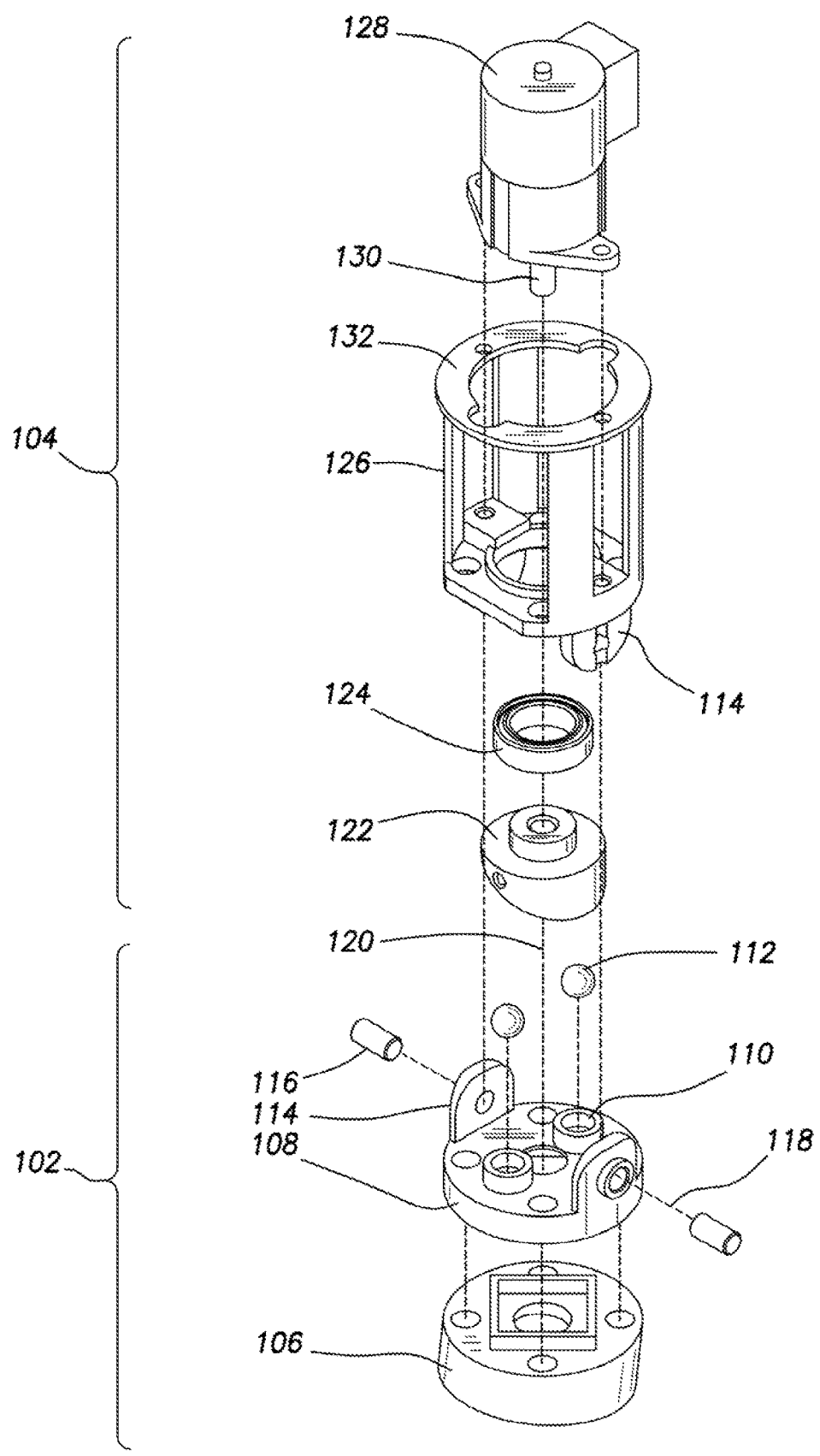
FIG. 1A illustrates an exploded view of a compact angular actuator and additional components, according to some implementations.
Figure 1B:
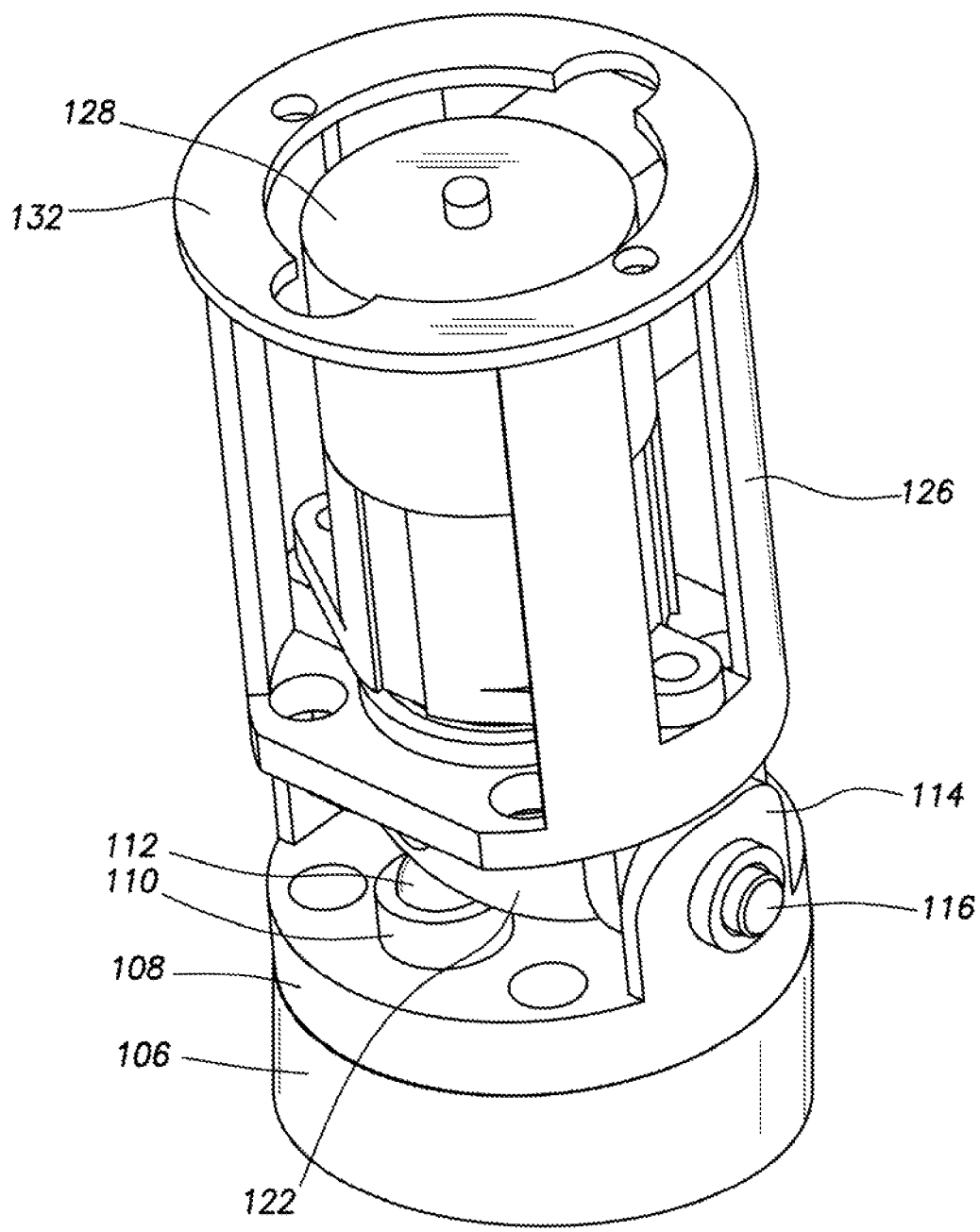
FIG. 1B illustrates an enlarged view of the assembled compact angular actuator, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

Actuators that produce movement may be used in a variety of situations. Some actuators provide translation, others rotation, and so forth. An actuator that tilts produces a change in angular configuration that may also include some displacement including translation. For example, an actuator that tilts may transition from a straight configuration to a bent configuration in which the actuator itself forms an angle.

One end of the actuator may be attached to a base such as a robot chassis, fixed mount, and so forth. A second end of the actuator supports a payload. For example, a robot may have a mast. A first end of the actuator is attached to an upper end of the mast, and a payload such as a camera is then attached to the second end of the actuator. This configuration allows the field of view (FOV) of the camera to be tilted downward. This downward tilt allows the camera to acquire images that may be useful, such as of a tabletop or counter.

Traditional actuators that produce a tilt are physically bulky, requiring significant volume. Other characteristics of traditional actuators include their mass that may result from the use of various gearing systems, support arms, and so forth. Traditional actuators may also require ongoing application of electrical power to maintain a particular angular position.

Described in this disclosure is a compact angular actuator. This actuator fits within a minimal volume, allowing for use in volume constrained applications. The overall mass of the actuator itself is low. The actuator is able to provide precise control of the tilt provided and maintains that tilt even when no electrical power is applied. This compact angular actuator may be used in a variety of applications. For example, the actuator may be mounted on a retractable mast that extends from a robot, allowing a sensor payload atop the actuator to be tilted to point at an area of interest. In another example the actuator may be used to provide a tilt capability to a sensor on an uncrewed aerial drone.

The compact angular actuator comprises a first section and a second section. The first section comprises two or more constraint components that are in contact with the face of a cam in the second section. For example, the constraint components may comprise ball bearings that are retained within ball bearing cups. In another example, the constraint components may comprise a solid member, such as a ridge or surface feature. These constraint components are arranged such that their points of contact are in a straight line.

The second section includes the cam that is circular in cross section and has a wedge-shaped face. For example, the cam may be visualized as a cylinder that has had one end sliced off at an oblique angle, producing a surface with an elliptical perimeter.

One or more hinges join the first section and the second section to one another, such that they may pivot about an axis of rotation. The axis of rotation described by the hinges may be perpendicular to the straight line formed by the points of contact of the constraint components.

As the cam is rotated about an axis that is perpendicular to and extends through a center of the circular cross section, the position on the face that the constraint components are in contact with changes. As a result, a force is imparted between the first section and the second section, changing the angular displacement between the two. The one or more hinges allow for the tilting action while preventing the first section and second section from separating. Meanwhile, the force between the constraint components and the face of the cam maintains a specific angular position.

The cam may be rotated by an electric motor. For example, a stepper motor may be used to rotate the cam and also provide control as to the rotation, and thus the tilt. In other implementations the cam may be rotated using pneumatic pressure, hydraulic pressure, or other mechanisms.

The actuator may facilitate the transfer of electrical signals from one section to the other. For example, a flexible printed circuit may be used to provide electrical connectivity between components attached to the first section and components attached to the second section.

In some implementations, elements of the actuator may be used to convey electrical power and data signals between electronics connected to the first section and the payload mounted to the second section. For example, pairs of hinge arms may be electrically conductive and electrically insulated from opposing pairs of hinge arms, providing two separate electrically conductive paths. In another example, the constraint components may act as one electrical contact while the cam acts as a second electrical contact. Electricity may then flow between the constraint components in the first section and the cam in the second section. In yet another example, the face of the cam may include one or more electrically conductive traces, each trace arranged to follow the path of a corresponding particular constraint component during rotation of the cam. Each constraint component may act as an electrical contact, that when in contact with the corresponding electrically conductive trace on the surface of the cam, provides a conductive pathway. The traces may extend from the face of the cam around to an edge surface or back side, where a spring contact or other mechanism provides an electrical connection that remains fixed with respect to the second section.

By using the hardware and the techniques described herein, a payload may be tilted, such as reorienting the field of view of a camera. As a result, the utility of a device may be improved. For example, a robotic assistant may use the actuator to tilt a camera mounted to an extensible mast, allowing the camera to view what is on a table, in a kitchen sink, on a counter, and so forth.

Illustrative System

FIG. 1A illustrates an exploded view of a compact angular actuator ("actuator") and additional components, according to some implementations. The actuator comprises a first section 102 and a second section 104.

The first section 102 may include a tilt bias section 106. In some implementations, the tilt bias section 106 may provide an initial tilt to the actuator. For example, as illustrated here the tilt bias section 106 comprises a flat face on an upper surface and a lower surface that is tilted 7 degrees with respect to the upper surface. The upper surface is joined to a base 108, while the lower surface is joined to a supporting member. For example, the supporting member may comprise an extensible mast. As described in this disclosure, two or more components or pieces may be joined using one or more of mechanical interference fit, adhesive, welding, fasteners, and so forth. For example, the tilt bias section 106 and the base 108 may be joined using screws.

A base 108 is shown. In some implementations the base 108 and the tilt bias section 106 may comprise a single piece. The base 108 may be circular in cross section.

The base 108 may include one or more hinge arms 114. The hinge arms 114 are used to join the first section 102 and the second section 104. Hinge pins 116 may be used to join two or more hinge arms 114. The line extended through the pivot point or axis of rotation described by joined hinge arms 114 is a hinge axis 118. In this illustration, the base 108 includes a first hinge arm 114 and a second hinge arm 114 that are arranged diametrically opposite one another with respect to the base 108.

Also extending from a surface of the base 108 are a plurality of constraint components. As depicted here, the constraint components comprise two ball bearing cups 110. A ball bearing 112 is retained within each ball bearing cup 110. The constraint components may be an integral portion of the base 108 or may be joined to the base 108.

In other implementations other constraint components may be used. For example, the constraint components may include a solid member extending away from the base 108, a pogo pin, and so forth. As described below, the constraint component comprises a contact surface. This contact surface may be rounded, flat and affixed to a hinge, and so forth.

A longitudinal axis 120 extends along a centerline of the actuator. For example, the longitudinal axis 120 may pass through the center of the circular cross section of the base 108.

The second section 104 includes a cam 122 that has a first surface and a second surface. In the assembled actuator, the first surface of the cam 122, also known as the face of the cam 122, is in contact with a portion of the constraint components. For example, the face of the cam 122 is in contact with the two ball bearings 112.

The cam 122 may include a stepped portion that fits within an inner portion of a rotary bearing 124. An outer surface of the rotary bearing 124 is affixed to a bracket 126. The rotary bearing 124 allows the cam 122 to rotate about the longitudinal axis 120 while keeping the cam 122 positioned laterally with respect to the actuator. In some implementations the rotary bearing 124 may be omitted and a bushing may be used.

The bracket 126 may include one or more hinge arms 114. The one or more hinge arms 114 may be engaged with the hinge arms 114 of the base 108. In this illustration, the bracket 126 includes a third hinge arm 114 and a fourth hinge arm 114 that are arranged diametrically opposite one another with respect to the bracket 126. The arrangement of the hinge arms 114 is such that the first hinge arm 114 is joined to the third hinge arm 114 using a first hinge pin 116, while the second hinge arm 114 is joined to the fourth hinge arm 114 using a second hinge pin 116. In other implementations, other types of hinges may be used to allow the first section 102 and the second section 104 to pivot or tilt with respect to one another, while maintaining them in proximity to one another.

A motor 128 is shown mounted within the bracket 126. A shaft 130 extends from the motor 128 and engages the cam 122 such that the shaft 130 and the cam 122 move in unison. The motor 128 may be electric, pneumatic, hydraulic, and so forth. In some implementations other devices may be used in place of the motor 128 to produce rotation. For example, the device may comprise a group of electroactive polymer (EAP) segments that may be affixed to the cam 122 and the bracket 126, such that contraction of the segments results in the cam 122 rotating with respect to the bracket 126. In another example, the device may comprise piezoelectric, electrostatic, or other components that produce rotation of the cam 122. The motor 128 may comprise an electric stepper motor that allows for the shaft 130 to be rotated in specific angular increments.

In other implementations the motor 128 may be offset from the axis of rotation. For example, the stepped portion of the cam 122 may comprise teeth, and the motor 128 may drive a gear that engages the teeth, causing the cam 122 to rotate. In this implementation, the longitudinal axis 120 of the cam 122 may be unobstructed. A flexible printed circuit, cable, hose, or other flexible structure may then pass through a hole in the center of the cam 122 and the base 108.

The bracket 126 may include or be attached to an interface surface 132. A payload may be attached to the interface surface 132. An opposite orientation of the actuator with respect to the payload may also be used. For example, the payload may be attached to the base 108 while the interface surface 132 is attached to a mast or other supporting structure.

During operation, as the cam 122 is rotated about the longitudinal axis 120 that is perpendicular to and extends through a center of the circular cross section of the cam 122, the position on the face that the ball bearings 112 are in contact with changes. As a result, a force is imparted between the first section 102 and the second section 104, changing the angular displacement between the two. The one or more hinges formed by the hinge arms 114 allow for the tilting action while preventing the first section 102 and second section 104 from separating. Meanwhile, the force between the ball bearings 112 and the face of the cam 122 maintains a specific angular position. The ball bearings 112 in turn exert a force on the ball bearing cups 110, which in turn exert a force on the base 108.

The constraint components, such as the ball bearings 112, are arranged such that points on the constraint components that come into contact with the face of the cam 122 are in a first line. This first line is not parallel to the hinge axis 118. For example, the first line and the hinge axis 118 may be perpendicular to one another.

The components of the actuator may be made of one or more of plastic, composite material, glass, metal, and so forth. For example, the bracket 126 and the base 108 may be a carbon fiber composite while the ball bearings 112 are steel. The components may be produced using one or more of casting, milling, molding, additive manufacturing, and so forth.

FIG. 18 illustrates an enlarged view of the assembled compact angular actuator, according to some implementations. In this view the tilt bias section 106 is shown attached to the base 108, providing some fixed tilt to the actuator. The ball bearings 112 are in contact with the face of the cam 122, while the hinge pins 116 join the hinge arms 114 on opposite sides of the actuator. The motor 128 is enclosed within the bracket 126. The interface surface 132 is available for the payload, another actuator, or other structure to be joined.

The actuator may be enclosed. The enclosure (not shown) may comprise rigid materials, flexible materials, or a combination thereof. The enclosure may provide concealment of the mechanism of the actuator, prevent intrusion of contaminants from the surrounding environment, and so forth. In one implementation the enclosure may comprise a plastic housing with one or more pleated sections that allow for the tilt of the actuator. In another example, an elastomeric covering may be used to enclose the portions of the actuator proximate to the hinge axis 118. In still another example, the payload or a payload enclosure may be arranged at least in part around a portion of the second section 104.

Figure 2A:
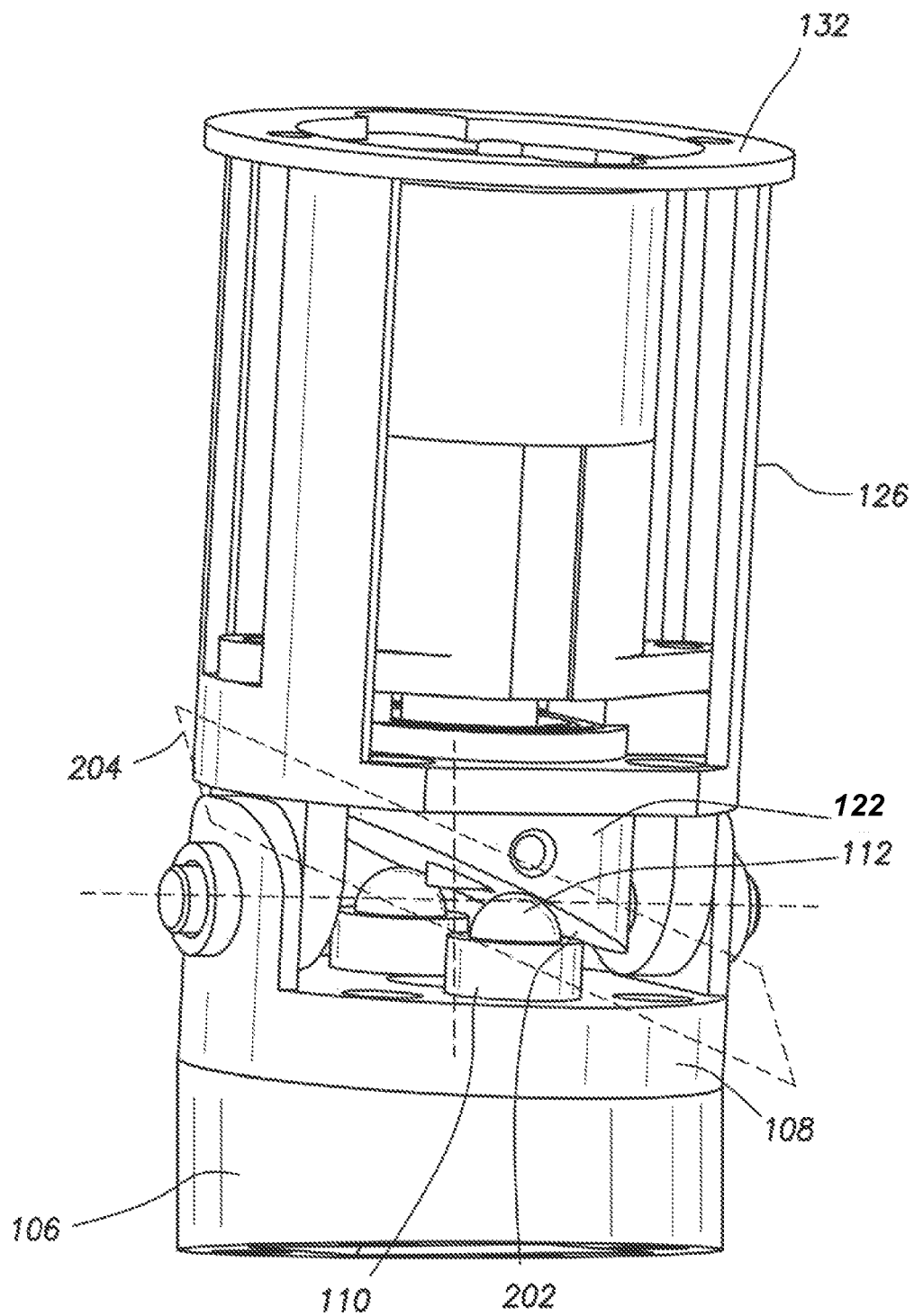
FIG. 2A illustrates the compact angular actuator in a first configuration, according to some implementations.

FIG. 2A illustrates the compact angular actuator in a first configuration, according to some implementations. Also shown is a view of the cam 122 in the orientation associated with this configuration in which a face 202 of the cam 122 is visible. A plane of the cam face 204 is also shown. The plane of the cam face 204 is not perpendicular to the longitudinal axis 120 of the cam 122. For example, the cam 122 may be visualized as a cylinder that has had one end sliced off at an oblique angle, producing the face 202 of the cam 122 that has a surface with an elliptical perimeter. The angle of the plane of the cam face 204 is greater than zero and less than 90 degrees relative to a plane perpendicular to the longitudinal axis 120 of the cam 122. For example, the angle of the plane of the cam face 204 may be between 1 and 0 degrees. The amount of angular displacement of the tilt is proportionate to the angle of the plane of the cam face 204.

In other implementations the face 202 of the cam 122 may describe a shape other than a plane. For example, the face 202 of the cam 122 may include one or more curves, describing an undulating profile.

In this configuration the actuator is substantially straight. The constraint components, in this case the ball bearings 112, are in contact with a portion of the face 202 of the cam 122 and maintain this configuration.

The actuator may facilitate the transfer of one or more of optical, radio, or electrical signals or power from one section to the other. In one implementation, a flexible printed circuit (FPC) may be used to provide electrical connectivity between components attached to the first section 102 and components attached to the second section 104. The FPC may extend from the first section 102 to the second section 104.

In some implementations, elements of the actuator may be used to convey electrical power and data signals across the actuator. In one implementation, a pair of hinge arms 114 that are in contact with one another may be electrically conductive, providing an electrically conductive pathway between the first section 102 and the second section 104. For example, opposing faces of the hinge arms 114 that are in contact with one another may have an electrically conductive material affixed thereto. In some implementations, a plurality of different electrical contacts or traces may be used. For example, concentric rings of conductive traces may be used to provide a plurality of separate electrical pathways between a pair of hinge arms 114 that are joined.

The conductive portions of the hinge arms 114 may be electrically insulated from other portions of the actuator. Continuing the example, the first hinge arm 114 of the base 108 and the third hinge arm 114 of the bracket 126 may provide a first electrically conductive pathway, while the second hinge arm 114 of the base 108 and the fourth hinge arm 114 of the bracket 126 provide a second electrically conductive pathway. As a result, two separate electrically conductive paths may be provided.

In another implementation, the constraint components, such as the ball bearings 112, may act as one electrical contact while the cam 122 acts as a second electrical contact. Electrical current may then be transferred between the constraint components in the first section 102 and the cam 122 in the second section 104. In this implementation, the cam 122 may itself be electrically conductive, such as comprising aluminum, or may be plated or coated with an electrically conductive material, such as aluminum, beryllium, carbon, and so forth.

In yet another implementation, the face 202 of the cam 122 may include one or more electrically conductive traces, each trace arranged to follow the path of a corresponding particular constraint component during rotation of the cam 122. At least a portion of the constraint component is electrically conductive. For example, the ball bearings 112 may comprise aluminum or steel, and a contact within the ball bearing cup 110 may provide an electrical pathway between the ball bearing cup 110 and the bearing 112.

Each constraint component may act as an electrical contact. When the constraint component is in contact with the corresponding electrically conductive trace on the face 202 of the cam 122, a conductive pathway is provided. The traces may extend from the face 202 of the cam 122 around to an edge surface or back side of the cam 122. A spring contact, roller contact, brush, FPC, or other mechanism provides an electrically conductive pathway between the portion of the trace that is on the edge surface or back side of the cam 122. This mechanism provides an electrical connection with the cam 122 while allowing the cam 122 to rotate. For example, the path of an electrical current may then be from a first connector on a first FPC that connects to the contact in the ball bearing cup 110, that in turn is in contact with a ball bearing 112. The ball bearing 112 is in turn in contact with a trace located on the face 202 of the cam 122. The trace provides a conductive pathway to a contact pad affixed to the bracket 126, that is attached to a second FPC that connects to a second connector. Thus, an electrically conductive pathway is provided between the first connector and the second connector.

One or more of the implementations as described above may be combined. For example, each pair of hinge arms 114 may be used to provide a separate electrically conductive pathway, as might the constraint components and the cam 122, allowing for at least three separate electrically conductive pathways.

Figure 2B:
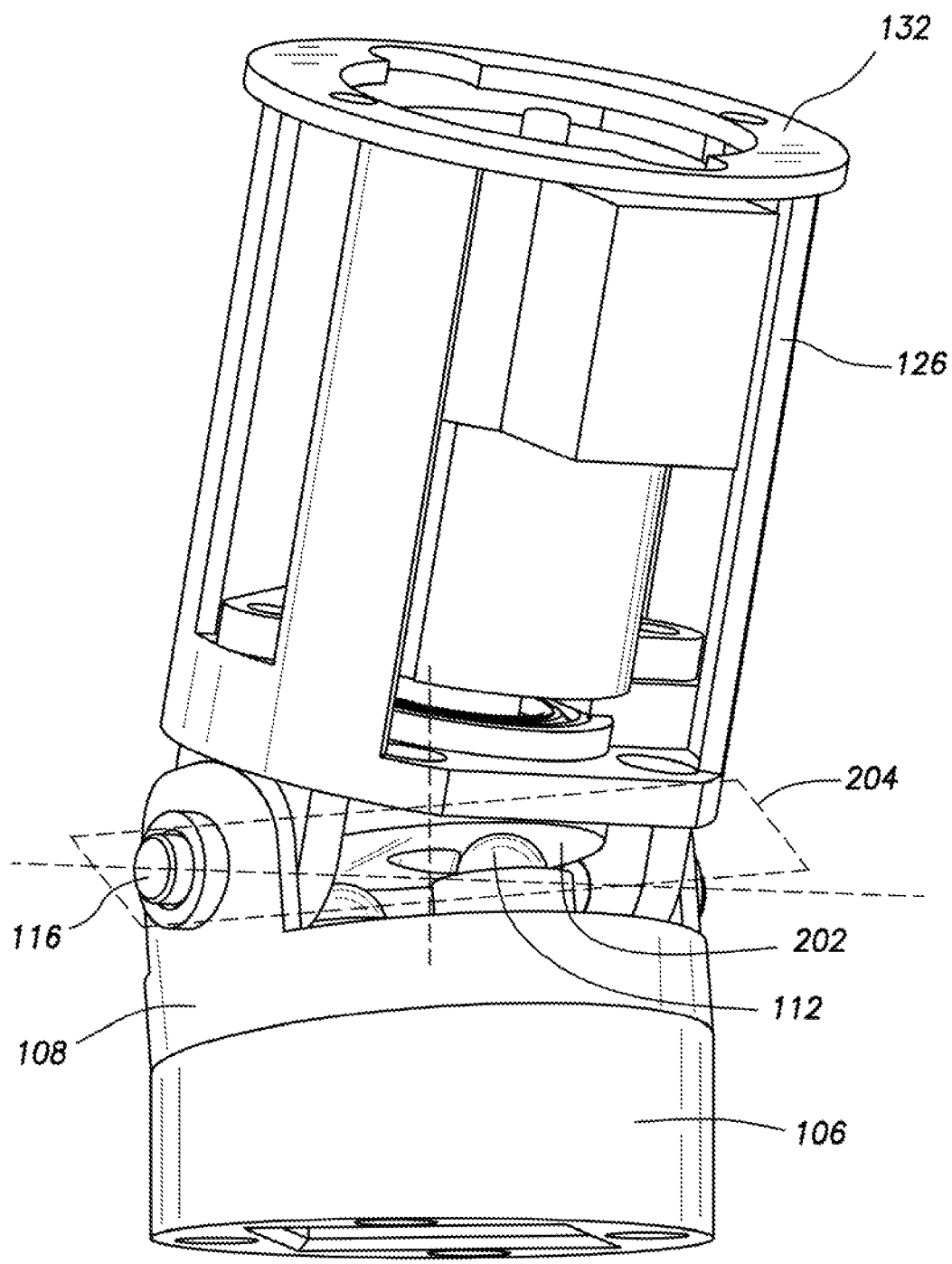
FIG. 2B illustrates the compact angular actuator in a second configuration, according to some implementations.

FIG. 2B illustrates the compact angular actuator in a second configuration, according to some implementations. Also shown is a view of the cam 122 in the orientation associated with this configuration, now rotated with respect to that orientation shown in FIG. 2A. In this second configuration, the rotation of the cam 122 has displaced the second section 104 with respect to the first section 102, producing a tilt or bend in the actuator.

Figure 3:
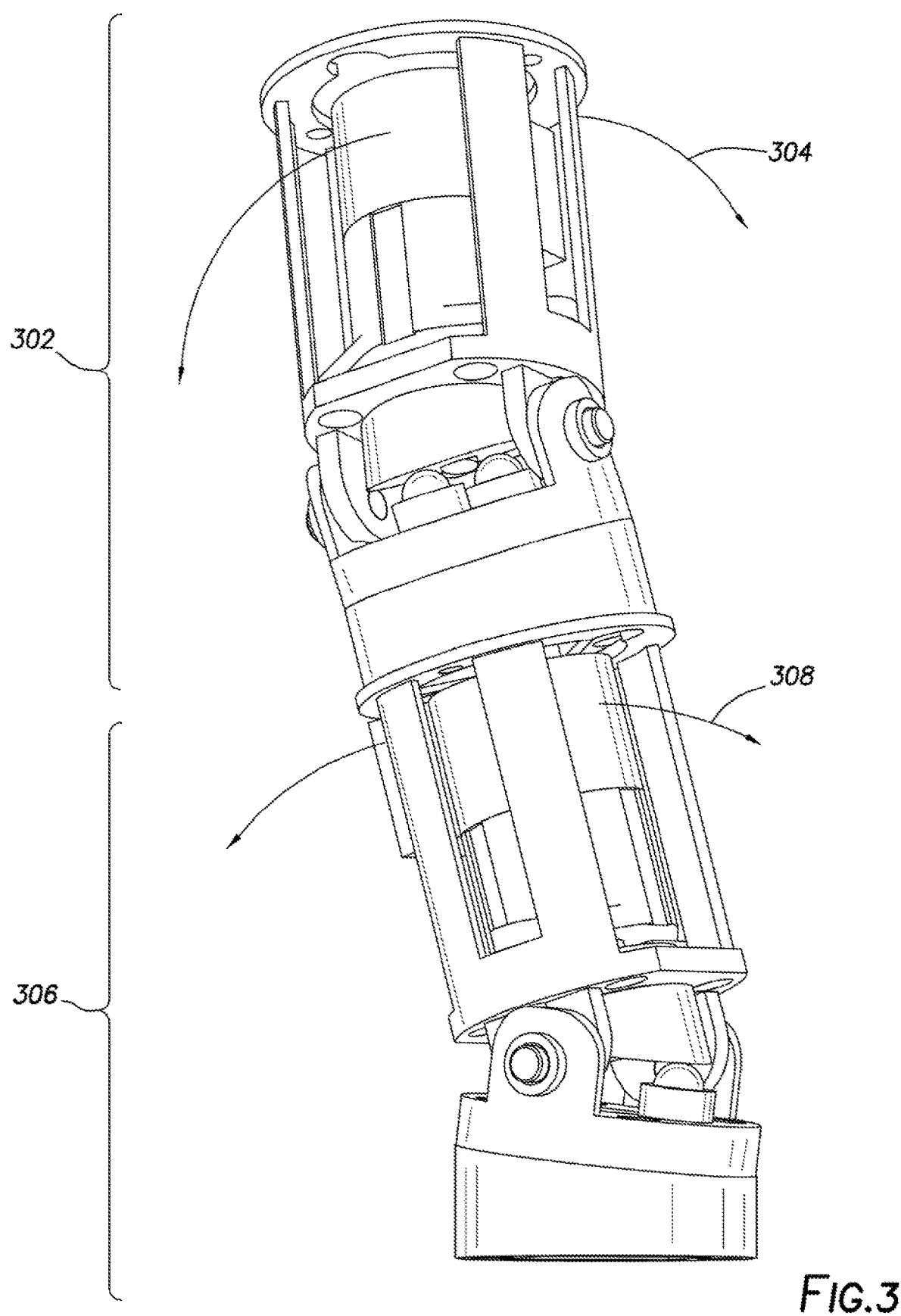
FIG. 3 illustrates a pair of compact angular actuators mounted in series to provide movement with two degrees of freedom, according to some implementations.

FIG. 3 illustrates a pair of compact angular actuators mounted in series to provide movement with two degrees of freedom, according to some implementations. A first actuator 302 is configured to provide a first direction of tilt 304, or degree of freedom. A second actuator 306 is joined to the first actuator 302. The second actuator 306 is configured to provide a second direction of tilt 308, or degree of freedom. In the implementation depicted, the first direction of tilt 304 and the second direction of tilt 308 are in different directions. In other implementations the directions of tilt may be aligned. Additional actuators may be joined together to provide further degrees of freedom or increase the range of motion.

Figure 4:
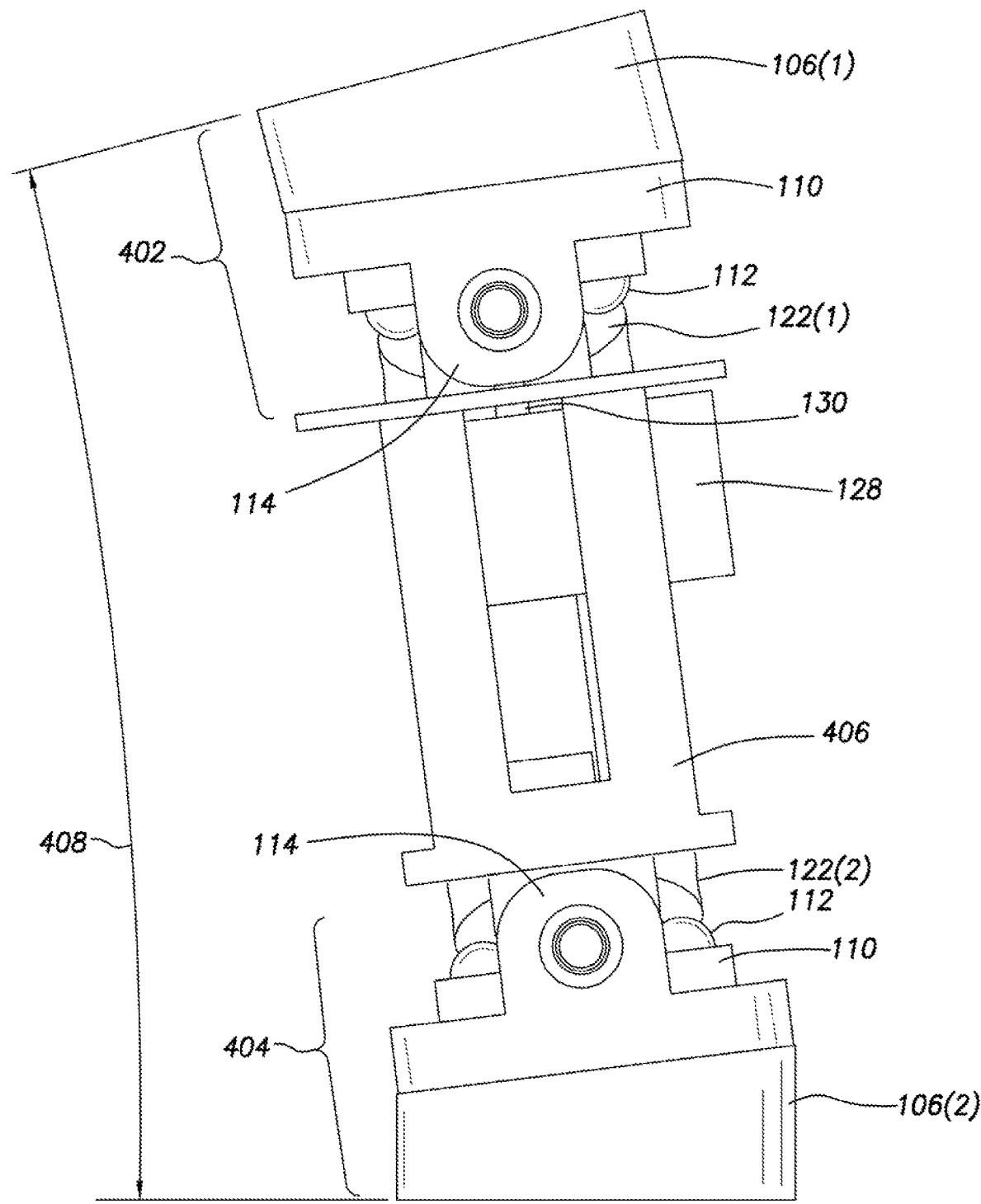
FIG. 4 illustrates a pair of compact angular actuators mounted in series to provide extended tilt along a single degree of freedom, according to some implementations.

FIG. 4 illustrates a pair of compact angular actuators mounted in series to provide extended tilt along a single degree of freedom, according to some implementations. In this illustration a first actuator section 402 includes a first tilt bias section 106(1), ball bearing cups 110, ball bearings 112, and a first pair of hinge arms 114. A second actuator section 404 includes a second tilt bias section 106(2), ball bearing cups 110, ball bearings 112, and a second pair of hinge arms 114. An intermediate section 406 comprises a bracket which supports a first cam 122(1) on a first end of the bracket and a second cam 122(2) on a second end of the bracket. The bracket also supports the motor 128 with a shaft 130 that extends to the first cam 122(1) and the second cam 122(2). The shaft 130 engages these cams 122 such that the cams 122 rotate in unison with the shaft 130.

The bracket of the intermediate section 406 also includes a third pair of hinge arms 114 on a first end and a fourth pair of hinge arms 114 on a second end. The first pair of hinge arms 114 join to the third pair of hinge arms 114, while the second pair of hinge arms 114 join to the fourth pair of hinge arms 114. As described above, the interaction between the cam 122, the ball bearings 112 or other constraint components, and the hinges produce a change in the angular displacement of the actuator.

In this implementation, a single motor 128 drives the two cams 122(1) and 122(2). The cams 122(1) and 122(2) may be arranged such that as they rotate, they tilt the overall actuator to form an arc 408. This allows the upper portion of the assembly to be tilted down while also being translated forward slightly. For example, when tilted the actuator approximately describes a "C" type curve. In other implementations, separate motors 128 may be used to drive each cam 122. The angle of the face 202 of the cam 122 may differ between the sections. For example, the angle of the face 202 of cam 122(1) may be less than the angle of the face 202 of cam 122(2).

Figure 5:
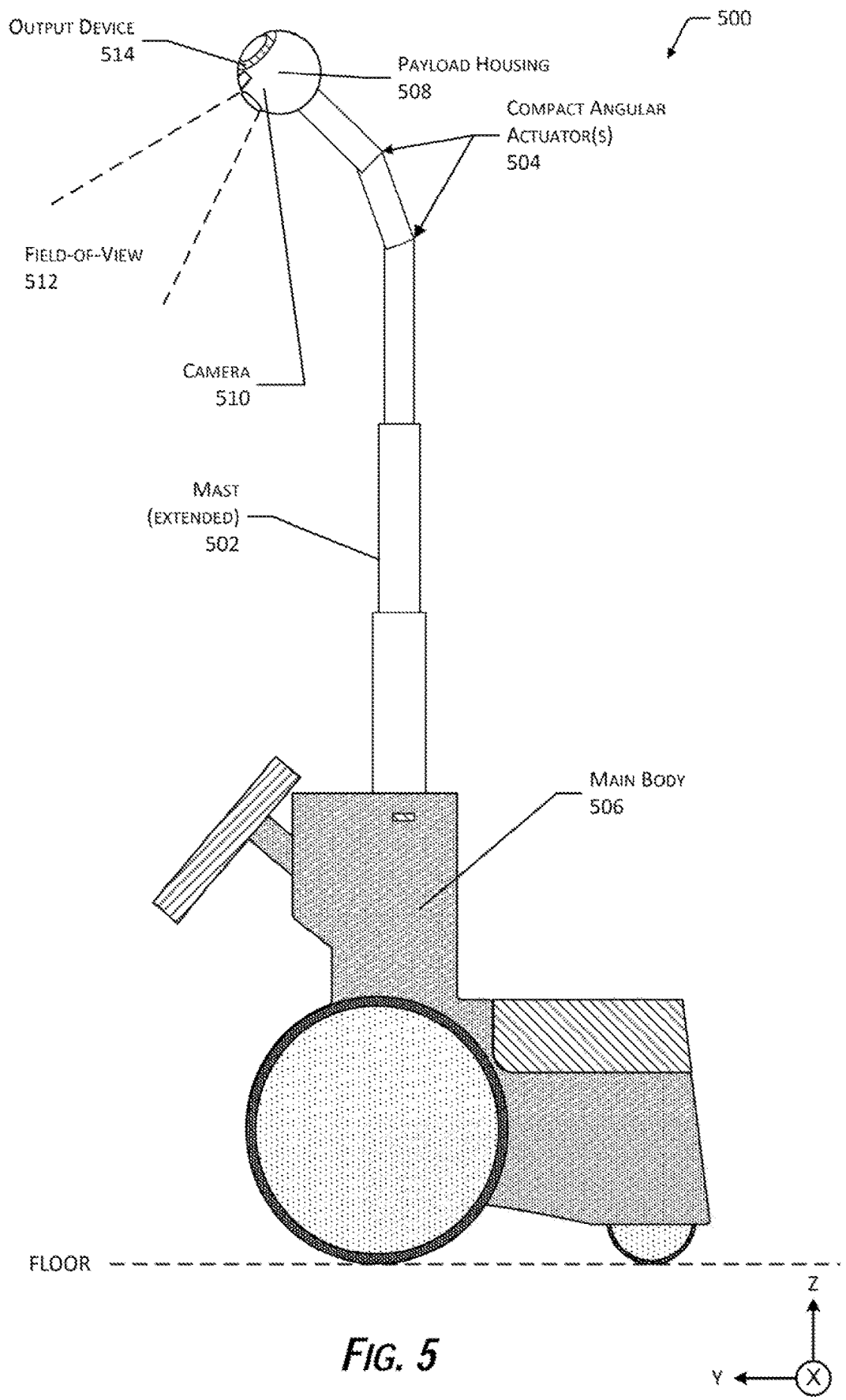
FIG. 5 illustrates a robot with a mast that incorporates the compact angular actuator to allow a camera atop the mast to be tilted down, according to some implementations.

FIG. 5 illustrates a robot 500 with a mast 502 that incorporates a pair of the compact angular actuators 504, such as described in FIG. 4. The mast 502 is affixed to a main body 506 of the robot 500. Atop the mast 502 is a payload housing 508. One or more sensors, such as a camera 510, microphones, and so forth, may be supported by the payload housing 508. The camera 510 has a field-of-view 512. The robot 500 may utilize the compact angular actuators 504 to tilt the upper portion of the mast 502. For example, the compact angular actuators 504 may be used to direct the field-of-view 512 downwards, providing an improved view of a countertop, sink, the floor in front of the robot 500, and so forth. Continuing the example, the compact angular actuators 504 may then be used to straighten the mast 502, directing the field-of-view 512 of the camera 510 generally forward.

In other implementations, the compact angular actuators 504 may be placed at different locations with respect to the mast 502. For example, a first compact angular actuator 504(1) may be placed proximate to the payload housing 508 while a second compact angular actuator 504(2) is placed closer to the main body 506. During operation, use of the second compact angular actuator 504(2) to tilt a longer portion of the mast 502 results in increased overall lateral displacement of the payload housing 508. For example, this may allow the robot 500 to move the payload housing 508 more directly over a feature of interest, such as a kitchen sink. Continuing the example, the first compact angular actuator 504(1) may then be used to further direct the field-of-view 512 of the camera 510 downwards into the sink.

In some implementations output devices 514 may also be supported by the payload housing 508. For example, the output devices 514 may include lights, speakers, and so forth.

In some implementations the mast 502 may be extensible. For example, the mast 502 may retract at least partially into the main body 506. The robot 500 may adjust the mast 502 to a height that places the camera 510 at a height sufficient to view a tabletop and utilize the compact angular actuators 504 to tilt the upper portion of the mast 502 such that the field-of-view 512 is downwards, providing an improved view of the tabletop.

In some implementations, communication between the devices in the payload housing 508 and other devices, such as within the robot 500 may be provided using one or more of the structures described above. For example, the ball bearings 112 and the cam 122 may be used as electrically conductive pathways, the hinge arms 114 may include electrical contacts, and so forth.

In other implementations the payload may communicate wirelessly. For example, a wireless communication link may be used to transfer data between the payload and other portions of the robot 500 or other devices, while electrical power is transferred via contacts in the hinge arms 114 or obtained from a battery in the payload housing 508.

In other implementations the devices described in this disclosure may be used in other types of devices. For example, a fixed device sitting on a table may utilize the compact angular actuator 504 to reposition a camera 510 or other sensor.

Those having ordinary skill in the art will readily recognize that the devices and techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A device comprising:
a first section comprising a base, the base comprising:
   on a first side of the base, a first hinge arm and a second hinge arm;
   a first ball bearing cup and a second ball bearing cup;
   a first ball bearing supported by the first ball bearing cup; and
   a second ball bearing supported by the second ball bearing cup; and
a second section comprising:
   a cam that has a flat face that is in contact with the first ball bearing and the second ball bearing;
   a bracket comprising a third hinge arm and a fourth hinge arm, wherein:
      a first hinge pin joins the first hinge arm and the third hinge arm; and
      a second hinge pin joins the second hinge arm and the fourth hinge arm;
   a rotary bearing that is in contact with a first part of the cam and a first part of the bracket; and
   a motor mounted to the bracket, wherein a shaft of the motor is engaged to the cam such that the shaft and the cam rotate in unison.

2. The device of claim 1, the first section further comprising:
a tilt section that has a side that is proximate to a second side of the base, wherein the second side of the base is opposite the first side of the base; and
wherein the side of the tilt section is at a non-zero angle relative to a plane that is perpendicular to an axis of the tilt section.

3. The device of claim 1, wherein:
the flat face of the cam is at a non-zero angle relative to a plane of a cross section of the cam; and
the non-zero angle between the flat face of the cam and the plane of the cross section of the cam is less than 60 degrees.

4. A device comprising:
a first section comprising:
   a first hinge element and a second hinge element;
   a first ball bearing cup and a second ball bearing cup;
   a first ball bearing supported by the first ball bearing cup; and
   a second ball bearing supported by the second ball bearing cup; and
a second section comprising:
   a cam having a first surface that is in contact with the first ball bearing and the second ball bearing, wherein the cam is circular in cross section, and wherein the first surface is a first plane between 1 and 80 degrees relative to a second plane that is perpendicular to an axis of rotation of the cam;
   a bracket comprising a third hinge element and a fourth hinge element, wherein:
      the first hinge element and the third hinge element are joined,
      the second hinge element and the fourth hinge element are joined, and
      the first hinge element, the second hinge element, the third hinge element, and the fourth hinge element share a common axis of rotation; and
   a motor mounted to the bracket to rotate the cam, wherein a shaft of the motor is affixed to a center of the cross section of the cam along the axis of rotation of the cam such that the shaft is perpendicular to a second surface of the cam, and wherein the shaft and the cam rotate in unison about the axis of rotation of the cam.

5. The device of claim 4, further comprising:
a first hinge pin that joins the first hinge element and the third hinge element; and
a second hinge pin that joins the second hinge element and the fourth hinge element.

6. The device of claim 4, further comprising:
a rotary bearing that is in contact with a first part of the cam and a first part of the bracket.

7. The device of claim 4, wherein:
the first ball bearing and the second ball bearing are arranged such that portions of the first ball bearing and the second ball bearing that come into contact with the first surface of the cam are in a first line and wherein the common axis of rotation of the first hinge element, the second hinge element, the third hinge element, and the fourth hinge element is not parallel to the first line.

8. The device of claim 4, further comprising:
an electrically conductive path on the first surface of the cam that extends to the second surface of the cam;
a first contact in the second section that establishes the electrically conductive path with an electrically conductive trace on the second surface;
an electrical conductor attached to the first ball bearing; and
wherein the first ball bearing is electrically conductive.

9. The device of claim 4, further comprising:
an electrically conductive path that extends from a first position to a second position on the first surface of the cam, wherein the first position and the second position correspond to a limit of rotation of the cam;
a first electrical conductor attached to the first ball bearing, wherein the first ball bearing is electrically conductive;
a second electrical conductor attached to the second ball bearing, wherein the second ball bearing is electrically conductive; and
circuitry connected to the first electrical conductor and the second electrical conductor, wherein the circuitry is configured to generate a signal indicative of the first ball bearing being in contact with the first position on the first surface of the cam and the second ball bearing being in contact with the second position on the first surface of the cam.

10. The device of claim 4, wherein the cam is electrically conductive and the first ball bearing is electrically conductive; and the device further comprising:
a first contact in the second section that establishes an electrically conductive path with the cam; and
an electrical conductor attached to the first ball bearing.

11. The device of claim 4, wherein:
the first hinge element and the third hinge element comprise at least a first electrically conductive pathway between the first section and the second section; and
the second hinge element and the fourth hinge element comprise at least a second electrically conductive pathway between the first section and the second section.

12. A device comprising:
a first section comprising:
   a first hinge element and a second hinge element on a first side of the first section;
   a first ball bearing; and
   a second ball bearing;
a second section comprising:
   a cam having a first surface and a second surface, wherein the first surface of the cam is in contact with the first ball bearing and the second ball bearing;
   a bracket comprising a third hinge element and a fourth hinge element, wherein:
      a first pin joins the first hinge element and the third hinge element; and
      a second pin joins the second hinge element and the fourth hinge element;
a motor to rotate the cam, wherein a shaft of the motor is engaged to the cam such that the shaft and the cam rotate in unison;
an electrically conductive path that extends from a first position to a second position on the first surface of the cam, wherein the first position and the second position correspond to a limit of rotation of the cam;
a first electrical conductor attached to the first ball bearing, wherein the first ball bearing is electrically conductive;
a second electrical conductor attached to the second ball bearing, wherein the second ball bearing is electrically conductive; and
circuitry connected to the first electrical conductor and the second electrical conductor, wherein the circuitry is configured to generate a signal indicative of the first ball bearing being in contact with the first position on the first surface of the cam and the second ball bearing being in contact with the second position on the first surface of the cam.

13. The device of claim 12, wherein:
the cam is circular in cross section; and
the first surface is a first plane that is at an angle of between 1 and 80 degrees relative to a second plane that is perpendicular to an axis of rotation of the cam.

14. The device of claim 12, wherein:
the first ball bearing and the second ball bearing are arranged such that portions of the first ball bearing and the second ball bearing that come into contact with the first surface of the cam are in a first line.

15. The device of claim 12, wherein the first ball bearing and the second ball bearing of the first section are arranged such that points on the first ball bearing and the second ball bearing that come into contact with the first surface of the cam are in a first line; and wherein an axis of rotation between the first section and the second section is not parallel to the first line.

16. The device of claim 12, wherein:
the cam is circular in cross section;
the first surface is a first plane that is at an angle of between 1 and 80 degrees relative to a second plane that is perpendicular to an axis of rotation of the cam; and
the shaft of the motor is affixed to a center of the cross section of the cam along the axis of rotation of the cam, such that the shaft is perpendicular to the second surface, and the shaft and the cam rotate in unison about the axis of rotation of the cam.

17. The device of claim 12, further comprising:
a second electrically conductive path on the first surface of the cam that extends to one or more of the second surface or a third surface of the cam; and
a first contact in the second section that establishes the second electrically conductive path with an electrically conductive trace.

18. The device of claim 12, further comprising:
a first contact in the second section that establishes a second electrically conductive path with the cam.

19. The device of claim 12, wherein:
the first hinge element and the third hinge element comprise at least a first electrically conductive pathway between the first section and the second section.

20. The device of claim 12, further comprising:
a rotary bearing that is in contact with a first part of the cam and a first part of the bracket.

21. A device comprising:
a first section comprising:
   a first constraint component;
   a second constraint component; and
   a first hinge element;
a second section comprising:
   a cam having a first surface in contact with the first constraint component and the second constraint component;
   a second device to rotate the cam; and
   a second hinge element, wherein the second hinge element is joined to the first hinge element via a hinge pin to constrain motion between the first section and the second section;
an electrically conductive path that extends from a first position to a second position on the first surface of the cam, wherein the first position and the second position correspond to a limit of rotation of the cam;
a first electrical conductor attached to the first constraint component;
a second electrical conductor attached to the second constraint component; and
circuitry connected to the first electrical conductor and the second electrical conductor, wherein the circuitry is configured to generate a signal indicative of the first constraint component being in contact with the first position on the first surface of the cam and the second constraint component being in contact with the second position on the first surface of the cam.

* * * * *